United States Patent [19]

Sakaguchi et al.

[11] Patent Number: 4,580,179
[45] Date of Patent: Apr. 1, 1986

[54] PLAYBACK SEARCH CONTROL DEVICE FOR A TAPE RECORDER

[75] Inventors: Shouzaburou Sakaguchi; Yoshiharu Ueki, both of Saitama, Japan

[73] Assignee: Pioneer Electronic Corp., Tokyo, Japan

[21] Appl. No.: 602,103

[22] Filed: Apr. 23, 1984

Related U.S. Application Data

[63] Continuation of Ser. No. 336,993, Jan. 4, 1982, abandoned.

[30] Foreign Application Priority Data

Jan. 6, 1981 [JP] Japan ................................. 56-945

[51] Int. Cl.[4] .................... G11B 19/02; G11B 15/48
[52] U.S. Cl. .................................. 360/69; 360/71; 360/74.1
[58] Field of Search ............... 360/13, 69, 70, 72.1, 360/72.2, 73, 74.1, 74.4, 74.5; 369/50

[56] References Cited

U.S. PATENT DOCUMENTS

| | | | |
|---|---|---|---|
| 3,893,177 | 7/1975 | Takenaka | 360/72.1 |
| 4,237,497 | 12/1980 | Trevithick | 360/72.1 |
| 4,241,364 | 12/1980 | Shiga | 360/72.1 |
| 4,270,152 | 5/1981 | Ida | 360/74.1 |
| 4,301,482 | 11/1981 | Trevithick | 360/74.4 X |
| 4,380,031 | 4/1983 | d'Alayer de Costemore d'Arc | 360/74.1 |
| 4,396,957 | 8/1983 | Ishii et al. | 360/72.1 |

*Primary Examiner*—Aristotelis M. Psitos
*Attorney, Agent, or Firm*—Sughrue, Mion, Zinn Macpeak & Seas

[57] ABSTRACT

During forward cue operation, clock pulses are counted until a predetermined number indicating a blank tape portion. Forward cue continues with only audio pulses being counted until a predetermined number have been counted indicating the next recorded tape portion. Reverse scan is then performed until the blank portion is again detected, and the machine is then switched to play mode.

9 Claims, 13 Drawing Figures

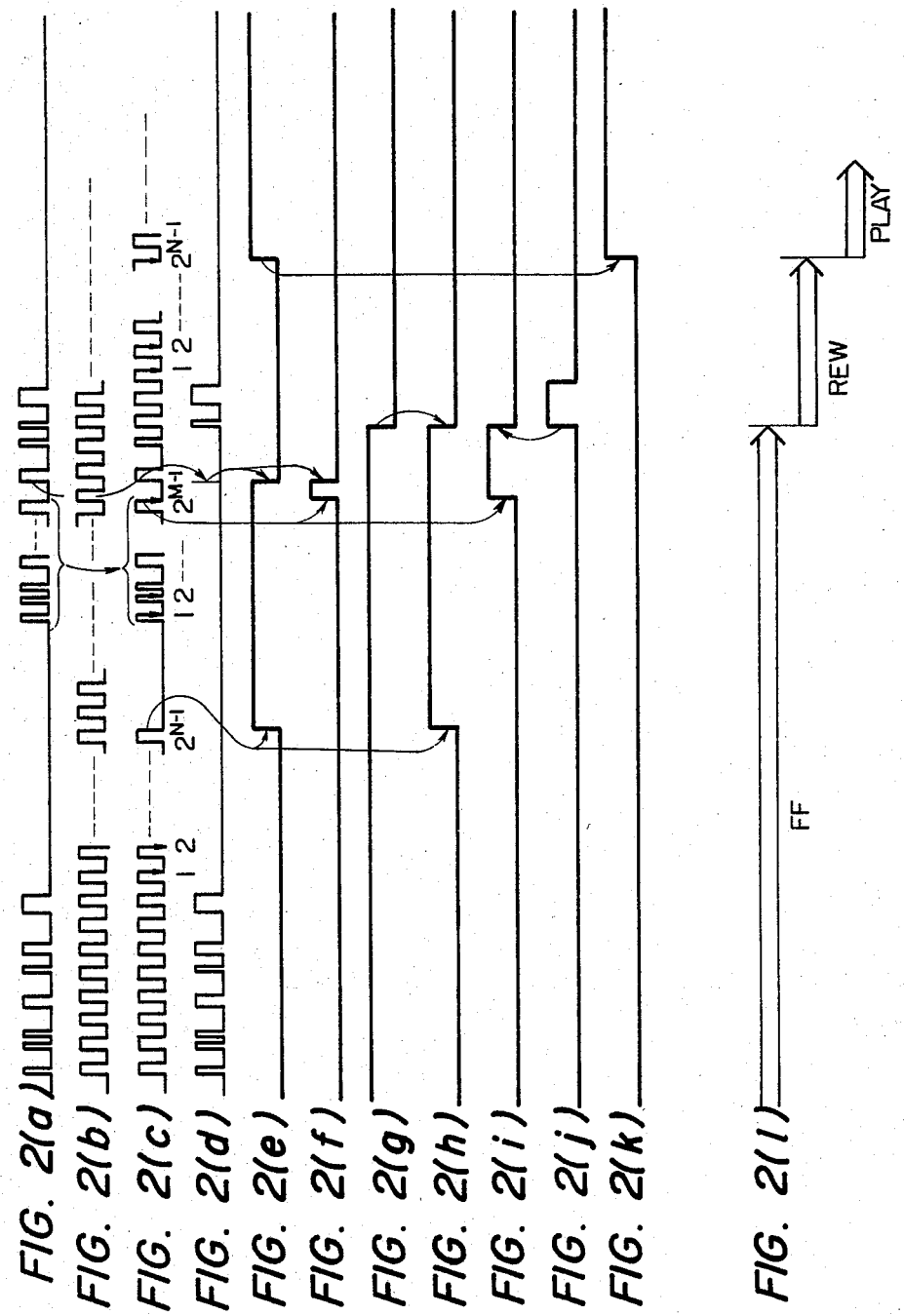

4,580,179

PLAYBACK SEARCH CONTROL DEVICE FOR A TAPE RECORDER

This application is a continuation of application Ser. No. 336,993, filed Jan. 4, 1982, now abandoned.

BACKGROUND OF THE INVENTION

This invention relates to tape recorders, and more particularly to a playback search control device for a tape recorder.

In a conventional playback search control device, when it is detected that a predetermined length of blank magnetic tape occurs after a signal such as music has been recorded, the tape recorder is set in a play mode, thus completing the playback search. Therefore, if while scanning in the forward direction a very long blank portion is encountered, the recorder will be set in a play mode but a long period of time may elapse from the time instant the tape recorder is set in a play mode until a recorded signal (e.g. music) is reproduced. If no recorded portion follows the blank portion having the predetermined length, the tape recorder is forced to continue to perform a useless play mode operation.

SUMMARY OF THE INVENTION

Accordingly, an object of this invention is to provide a playback search control device in which the top (i.e. the beginning, or leading edge) of a recorded portion of a magnetic tape is positively detected, to thereby eliminate the wasting of timing.

In a playback search control device according to this invention, a counter is employed in such a manner that a clock pulse is applied to the clock input terminal of the counter and an audio pulse, which is obtained by converting the output audio signal of a reproducing head, is applied to the clear input terminal of the counter. The blank portion is detected from the fact that the count value of the counter has reached a predetermined value. Then, the audio pulse is applied to the clock input terminal, and the top, or leading edge, of a recorded portion of the tape is detected from the fact that the count value has reached another predetermined value. The machine then scans in reverse until the blank portion is again detected, at which time it switches to play mode.

BRIEF DESCRIPTION OF THE DRAWINGS

One embodiment of this invention will be described with reference to the accompanying drawings, in which:

FIGS. 2(a) through 2(k) are time charts indicating the waveforms of signals at various locations in the circuit of FIG. 1; and FIG. 2(l) is a diagram showing the variations in operation mode of a tape recorder.

DETAILED DESCRIPTION OF THE INVENTION

Figure 1:
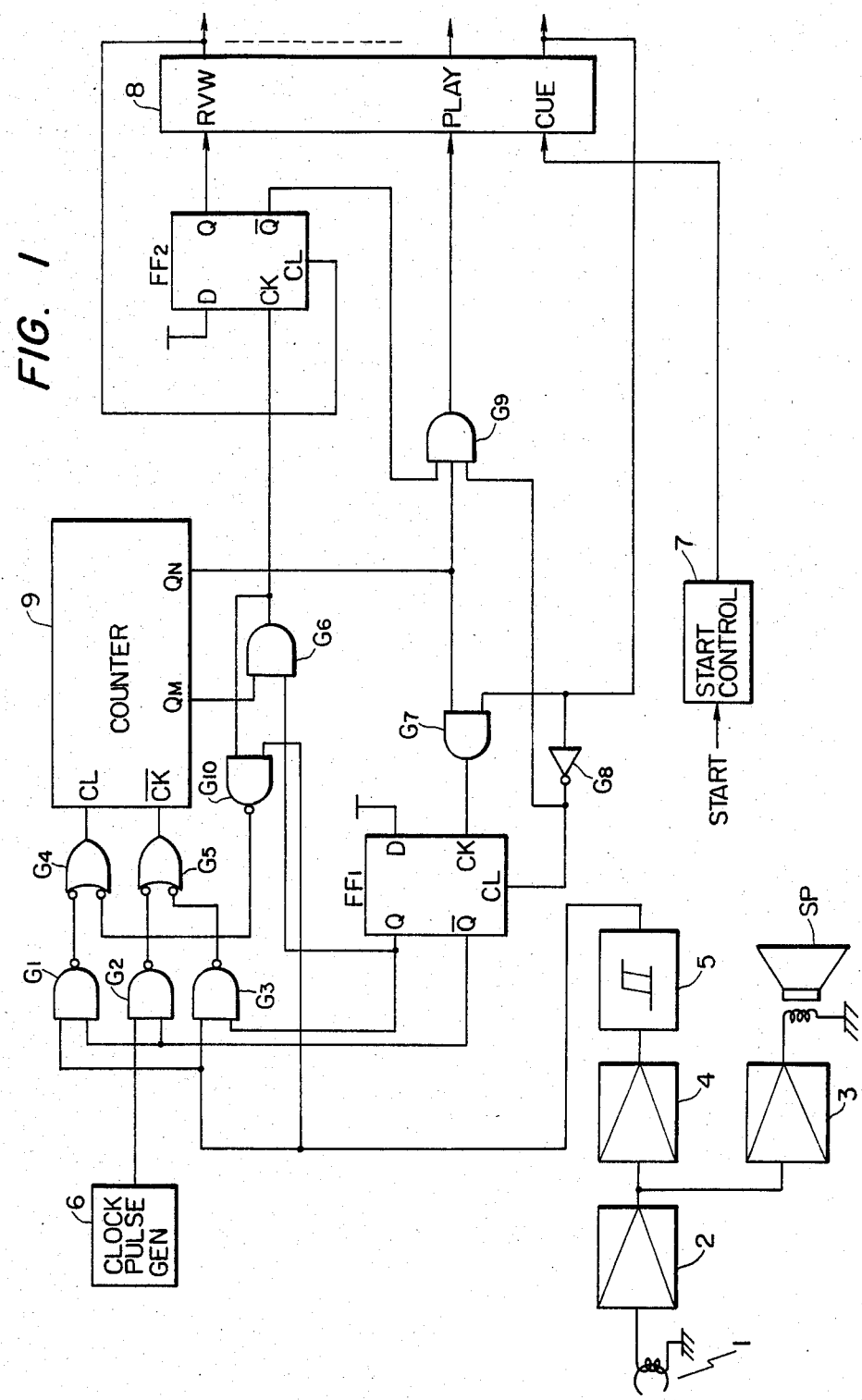
FIG. 1 is a circuit diagram showing a playback top search control device according to the invention.

In FIG. 1, a recorded audio signal is picked up by a reproducing head 1 and is supplied through an equalizer amplifier 2 to amplifiers 3 and 4. The audio signal amplified by the amplifier 3 is reproduced by a loudspeaker SP. On the other hand, the audio signal amplified by the amplifier 4 is shaped by a Schmitt trigger circuit 5 into a pulsive audio signal, i.e., an audio pulse signal. That is, the amplifier 4 and the Schmitt trigger circuit 5 form a waveform conversion circuit. The output audio pulse of the Schmitt trigger circuit 5 is applied to first input terminals of NAND gates $G_1$ and $G_3$. A clock pulse generator 6 outputs a clock pulse having a predetermined frequency, which is applied to a first input terminal of a NAND gate $G_2$.

A search start control circuit 7 provides an "L" level signal at its output terminal before a playback search instruction signal is applied thereto, but the circuit 7 provides an "H" level signal when the search instruction signal is applied. The "H" level signal is applied to a cue instruction terminal (CUE) of a tape recorder mechanism control section 8, so that the tape recorder starts a cue operation (which is a FF operation with the reproducing head being in contact with the tape). In this case, a flip-flop circuit $FF_1$ is in a reset state, thus applying an "H" level signal through its $\bar{Q}$ terminal to second input terminals of the NAND gates $G_1$ and $G_2$. Therefore, the clock pulse is supplied through the NAND gate $G_2$ and a NAND gate $G_5$ to a clock input terminal of a counter 9, and the audio pulse from the Schmitt trigger circuit 5 is supplied through the NAND gate $G_1$ and a NAND gate $G_4$ to a clear input terminal of the counter 9.

Therefore, when the tape recorder has started the cue operation in response to the playback search instruction signal applied to the start control circuit 7 and the reproducing head is in contact with a signal recorded portion of the tape, audio pulses are successively applied to the clear input terminal of the counter 9 and therefore the count value of the counter 9 is not increased. However, when the reproducing head comes to a blank portion between recorded portions of the tape then no audio pulses are supplied, and accordingly the count value of the counter 9 is increased. When the count value of the counter 9 reaches a first predetermined value $K=2^{N-1}$ (N being a natural number), the counter 9 outputs an "H" level signal through its output terminal $Q_N$. The "H" level signal is applied to one input terminal of an AND gate $G_7$. At the same time, an "H" level signal is applied to the other input terminal of the AND gate $G_7$ from the cue output terminal of the mechanism control section 8. Therefore, an "H" level signal is applied to a CK terminal of the D-type flip-flop circuit $FF_1$, to set the latter $FF_1$. Therefore, the $\bar{Q}$ terminal of the D flip-flop circuit $FF_1$ is set to an "L" level, while the Q terminal is raised to an "H" level. Thus, when the reproducing head comes to the blank portion, as detected by the count N, the circuitry as reconfigured such that only the audio pules of the Schmitt trigger circuit 5 can thereafter be applied to the clock input terminal of the counter 9. There will, of course, be no audio pulses from the trigger circuit 5 during the blank portion of the tape, but the reconfiguration of the circuitry of FIG. 1 will now mean that the counter 9 will begin counting the audio pulses upon reaching a recorded portion of the tape. The counter 9 is designed as an N-bit counter, and therefore the counter 9 overflows and starts from zero again when counting the audio pulses. When the count value of the counter reaches a second predetermined value $L=2^{M-1}$ (M being a natural number, and $M<N$), the counter 9 provides an "H" level signal at its output terminal $Q_M$. This "H" level signal is a blank portion detection signal representative of the fact that the reproducing head has passed the end of a blank portion of the tape and is now detecting a recorded portion.

The D-type flip-flop $FF_1$ is in a set state as described above. Therefore, "H" level signals are applied to both input terminals of an AND gate $G_6$, which outputs an "H" level signal. (It will be appreciated that, since M<N, the $Q_M$ output also occurs during counting of both audio and clock pulses. However, since $FF_1$ is reset in such a case, the $Q_M$ output will not pass through gate $G_6$.) This "H" level signal is applied to another D-type flip-flop circuit $FF_2$ to set the latter $FF_2$, and is further applied through a gate $G_{10}$ and the gate $G_4$ to the counter 9 to clear the counter 9. When the D-type flip-flop circuit $FF_2$ is set, it applies an "H" level signal through its Q terminal to a review instruction terminal (RVW) of the mechanism control section 8. As a result, the tape recorder starts a review operation (which is a rewinding operation with the reproducing head kept in contact with the tape). In this case, the RVW output of the control circuit 8 resets $FF_2$ and the CUE output terminal of the mechanism control section 8 is set to the "L" level. Therefore, an "H" level signal from a gate $G_8$ is supplied to a clear terminal of the D-type flip-flop circuit $FF_1$ to reset the latter $FF_1$. Thus, both the clock pulse and the audio pulse are now applied to the clock input terminal and the clear terminal of the counter 9, respectively. When, under this condition, the reproducing head comes back to the blank portion of the tape, the count value of the counter 9 begins to increase. When the count value reaches the N, the output terminal $Q_N$ is raised to the "H" level. In this case, the $\overline{Q}$ terminal of the D-type flip-flop circuit $FF_2$ is at the "H" level, and the output of the gate $G_8$ is also at the "H" level. Therefore, a gate $G_9$ applies an "H" level signal to a play instruction input terminal (PLAY) of the mechanism control section 8, as a result of which the tape recorder is set in the play mode. Thus, the playback search operation has been completed.

The signal waveforms of various elements in the circuit of FIG. 1 are as shown in FIGS. 2(a) through 2(k). FIG. 2(a) shows the audio pulse from the Schmitt trigger circuit 5; FIG. 2(b), the clock pulse outputted by the clock pulse generator 6; FIG. 2(c), the input pulse to the clock input terminal of the counter 9; and FIG. 2(d), the input pulse to the clear terminal of the counter 9. FIGS. 2(e) and 2(f) show the output signals at the output terminals $Q_M$ and $Q_N$ of the counter 9, respectively; FIG. 2(g), the output signal from the cue output terminal of the mechanism control section 8; FIGS. 2(h) and 2(i), the output levels at the Q terminals of the flip-flops $FF_1$ and $FF_2$; and FIGS. 2(j) and 2(k), the signal waveforms of the review output and the play output of the mechanism control section 8. FIG. 2(l) shows the tape recorder operation mode variations with the signal waveform variations shown in FIGS. 2(a) through 2(k).

In the above-described embodiment, the counter 9 is set as an N-bit counter, and the terminal $Q_N$ is employed as an overflow terminal; however, a count value which is obtained before overflowing takes place may instead by employed. In the latter case, a circuit to clear the counter 9 with the output at the terminal $Q_N$ should be provided.

As is apparent from the above description, in the playback search control device according to the invention, the blank portion detection timing is set by allowing the counter to count a predetermined number of clock pulses, and the recorded portion detection timing is set by counting a predetermined number of pulses which are obtained from the output audio signal of the reproducing head. Therefore, two different kinds of timing can be set accurately by a signal counter. Thus, the playback search control device of the invention is relatively simple in circuitry.

What is claimed is:

1. A playback search control device for a tape recorder having a cue function wherein a tape is moved in a first direction, a review function wherein said tape is moved in a second direction opposite said first direction and a play function wherein said tape is played back while moving in said first direction, said tape recorder performing said cue, review and play functions in response to cue, review and play instruction signals, respectively, said control device comprising:

clock pulse means for generating clock pulses;
audio pulse means for generating audio pulses in response to recorded portions of a tape;
counting means for receiving said clock pulses and said audio pulses and for counting said audio pulses during recorded portions of said tape and for counting said clock pulses during unrecorded portions of said tape; and
mechanism control means for providing said cue instruction signal until said counter counts a first predetermined number of clock pulses followed by a second predetermined number of said audio pulses, said mechanism control means being responsive to said counted second predetermined number of audio pulses for providing said review instruction signal until a third predetermined number of said clock pulses are counted, and said mechanism control means being responsive to said counted third predetermined number of clock pulses for providing said play instruction signal after said third predetermined number of clock pulses are counted.

2. A playback search control device as claimed in claim 1, wherein said first and second predetermined numbers are different.

3. A playback search control device as claimed in claim 2, wherein said second predetermined number is less than said first predetermined number.

4. A playback search control device as claimed in claim 1 or 2, wherein said first and third predetermined numbers are the same.

5. A playback search control device as claimed in claim 1, wherein said counting means includes;

a counter having a clock terminal and a clear terminal;
gate circuit means receiving said clock and audio pulses for forwarding said clock pulses to said clock terminal and said audio pulses to said clear terminal in response to a first gate signal ($\overline{Q}$) and for providing said audio pulses to said clock terminal in response to a second gate signal (Q); and
gate control means (e.g. $FF_1$) for providing said first gate signal to said gate means during cue oparation until said first predetermined number is counted, for providing said second gate signal to said gate means during said cue operation in response to said first predetermined count until said second predetermined number is counted, and for providing said first gate signal to said gate means after said second predetermined number is counted and until said third predetermined number is counted.

6. A playback search control device as claimed in claim 5, wherein said second predetermined number is less than said first predetermined number, further comprising clear means for clearing said counter in response to said second count during said second gate signal.

7. A playback search control device as claimed in claim 5, wherein said mechanism control means provides said play instruction signal in response to a play control signal, said control device further comprising play mode gate means (G9) for providing said play control signal in response to counting said third predetermined number, and disabling means (G8) for disabling said play mode gate means during said cue operation.

8. A playback search control device as claimed in claim 7, wherein said first and third predetermined numbers are equal.

9. In a tape player of the type performing forward operation by moving said tape in a first direction in response to a forward control signal, reverse operation by moving said tape in a second direction opposite said first direction in response to a reverse control signal and play operation by moving said tape in said first direction in response to a play control signal, a playback search control device comprising:

- detection means for detecting blank and recorded portions of a tape; and
- control means for providing said forward control signal for a period of time until a first blank tape portion and a recorded tape portion are detected in the stated order while moving in said first direction and thereafter for providing said reverse control signal in response to detection of said recorded portion until said blank portion is again detected while moving in said second direction, and thereafter for providing said play control signal in response to the detection of said blank portion while moving in said second direction, said tape being thereafter moved in said first direction in response to said play control signal.

* * * * *